US006692324B2

(12) United States Patent
Simpson et al.

(10) Patent No.: US 6,692,324 B2
(45) Date of Patent: Feb. 17, 2004

(54) SINGLE SELF-ALIGNED CARBON CONTAINING TIPS

(75) Inventors: Michael L. Simpson, Knoxville, TN (US); Douglas H. Lowndes, Knoxville, TN (US); Vladimir I. Merkulov, Knoxville, TN (US); Michael A. Guillorn, Knoxville, TN (US); Charles L. Britton, Alcoa, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 109 days.

(21) Appl. No.: 09/810,531

(22) Filed: Mar. 15, 2001

(65) Prior Publication Data

US 2002/0024279 A1 Feb. 28, 2002

Related U.S. Application Data

(60) Provisional application No. 60/228,713, filed on Aug. 29, 2000.

(51) Int. Cl.[7] .................................................. H01J 9/02
(52) U.S. Cl. ........................ 445/24; 313/309; 313/311
(58) Field of Search ........................................... 445/24

(56) References Cited

U.S. PATENT DOCUMENTS

| 5,773,921 A | * | 6/1998 | Keesmann et al. | ......... 313/309 |
| 5,855,675 A | * | 1/1999 | Doering et al. | ............. 118/719 |
| 5,892,231 A | * | 4/1999 | Baylor et al. | ............... 250/398 |
| 6,512,235 B1 | * | 1/2003 | Eitan et al. | .............. 250/423 F |

OTHER PUBLICATIONS

Baker, "Catalytic growth of carbon filaments," *Carbon*, 27(3):315–323, 1989.
Merkulov et al., "Patterned growth of individual and multiple vertically aligned carbon nanofibers," *Appl. Phys. Lett.*, 76(24):3555–3557, 2000.

Ren et al., "Growth of a single freestanding multiwall carbon nanotube on each nanonickel dot," *Appl. Phys. Lett.*, 75(8):1086–1088, 1999.
Ren et al., "Synthesis of large arrays of well–aligned carbon nanotubes on glass," *Science*, 282:1105–1107, 1998.
Guillorn, et al., "Operation of a gated field emitter using an individual carbon nanofiber cathode," Applied Physics Letters, vol. 79, No. 21, pp. 3506–3508, Nov. 19, 2001.
Baylor, et al., "Field emission from isolated individual vertically aligned carbon nanocones" Journal of Applied Physics, vol. 91, No. 7. pp. 4602–4606, Apr. 1, 2002.
Saito et al., "Field Emission Patterns from Single–Walled Carbon Nanotubes," Japan Journal Applied Physics, vol. 36, pp. 1340–1342, Oct. 1, 1997.
Matsumoto, et al., "Ultralow biased field emitter using single–wall carbon nanotube directly grown onto silicon tip by thermal chemical vapor deposition," Applied Physics Letters, vol. 78, No. 4, pp. 539–540, Jan. 22, 2001.

(List continued on next page.)

*Primary Examiner*—Kenneth J. Ramsey
(74) *Attorney, Agent, or Firm*—Gray Cary Ware & Freidenrich, LLP

(57) ABSTRACT

Systems and methods are described for a single self-aligned carbon nanofiber emitters within a dielectric well. A method, includes: providing a substrate; defining lithographically a catalyst particle, the catalyst particle coupled to the substrate; depositing a dielectric layer, the dielectric layer coupled to the substrate; depositing an extractor layer, the extractor layer coupled to the dielectric layer; forming an extractor aperture in the extractor layer; forming a dielectric well in the dielectric layer to uncover the catalyst particle; and then fabricating at a location of the catalyst particle and within the dielectric well a single self-aligned carbon containing tip i) having a base located substantially at the bottom of the dielectric well and ii) extending substantially away from the substrate using plasma enhanced chemical vapor deposition.

30 Claims, 8 Drawing Sheets

OTHER PUBLICATIONS

Guillom et al., "Fabrication of gated cathode structures using an *in situ* grown vertically aligned carbon nanofiber as a field emission element", Journal of Vacuum Science, pp. 573–578, Mar./Apr. 2001.

Rinzler, et al., "Unraveling Nanotubes: Field Emission from an Atomic Wire" avaliable at www.jstor.org, pp. 1550–1553, May 9, 2002.

Xu, et al., "A method for fabricating large–area, patterned, carbon nanotube field emitters," Applied Physics Letters, vol. 74, No. 17, pp. 2549–2551, Apr. 26, 1999.

Merkulov, et al., "Scanned–probe field–emission studies of vertically aligned carbon nanofibers" Journal of Applied Physics, vol. 89, No. 3, pp. 1933–1937, Feb. 1, 2001

Bonard, et al., "Field emission from single–wall carbon nanotube films" Applied Physics Letters, vol. 73, No. 7, pp. 918–920, Aug. 17, 1998.

Xu, et al., "Carbon Nanotube–based vacuum microelectronic gated cathode," Material Research Society Symposium, vol. 509, pp. 107–109, 1998.

Dean, et al., "The environmental stability of field emission from single–walled carbon nanotubes" Applied Physics Letters, vol. 75, No. 19, pp. 3017–3019, Nov. 8, 1999.

Wang, et al., "Flat panel display prototype using gated carbon nanotube field emitters," Applied Physics Letters, vol. 78, No. 9, pp. 1294–1296, Feb. 26, 2001.

Lee, et al., "Realization of Gated Field Emitters for Electrophotonic Applications Using Carbon Nanotube Line Emitters Directly Grown into Submicrometer Holes," Advanced Materials Communications, vol. 13, No. 7, pp. 473–482, Apr. 4, 2001.

Guillorn, et al., "Microfabricated field emission devices using carbon nanofibers as cathode elements", Journal of Vaccuum Science Technology B19(6), pp. 2598–2601, Nov./Dec. 2001.

* cited by examiner

SINGLE SELF-ALIGNED CARBON CONTAINING TIPS

CROSS-REFERENCE TO RELATED APPLICATION

This application is related to, and claims a benefit of priority under 35 U.S.C. 119(e) and/or 35 U.S.C. 120 from copending U.S. Ser. No. 60/228,713, filed Aug. 29, 2000, now pending, the entire contents of which are hereby expressly incorporated by reference for all purposes.

STATEMENT AS TO RIGHTS TO INVENTIONS MADE UNDER FEDERALLY-SPONSORED RESEARCH AND DEVELOPMENT

This invention was made with United States Government support under contract to UT-Battelle, LLC. The Government has certain rights in this invention.

BACKGROUND OF THE INVENTION

1. Field of the Invention

The invention relates generally to the field of carbon containing tips. More particularly, the invention relates to carbon containing tips that can be used as field emitting devices.

2. Discussion of the Related Art

For many years, thermionic vacuum tubes were the dominant devices in electronic circuits and systems. However, vacuum tube technology was almost completely replaced by semiconductor technology in the late 1950s due to four major disadvantages associated with vacuum tube technology. First, power was consumed to heat the electron source to cause thermionic electron emission. Second, high operational voltages were required. Third, current densities were extremely low (~0.5 A/cm$^2$). Fourth, high levels of integration (e.g. integrated circuits) could not be reached.

Although it has been more than 40 years since the decline of the vacuum tube, strong interest and active research has recently reemerged in vacuum microelectronics (Brodie and Schwoebel, 1994; Temple, 1999). A practical vacuum microelectronic technology has been pursued to achieve the following advantages. First, is the advantage of high-frequency operation. Ballistic transport of electrons in a vacuum is inherently faster than collision-limited transport in a solid. Operation at THz frequencies and above may be possible. Second is the advantage of temperature insensitivity: Devices based on field emission would operate over a very large temperature range compared to semiconductor devices. Third is the advantage of radiation hardness. Vacuum devices are inherently radiation hard since they do not depend on transport through a low-defect lattice. Fourth is the advantage of being able to utilize simple materials; No high-purity, single crystal materials are required. Fifth is the advantage of small size and high-density integration: Individual VME devices can become substantially sub-micron in size, leading to device densities >10$^8$/cm$^2$, in striking contrast to the limitations of vacuum tubes.

The renewed interest in vacuum microelectronics was fueled by Spindt's development of a field emission tip (now known as the Spindt tip) that operates at pressures easily accessible for practical devices and manufacturable by modern microfabrication techniques (Spindt, 1968). Spindt Tips are metallic cones with a tip radius of curvature of ~300 Å that allows for a large geometrical enhancement of the local electric field and a relatively low turn-on voltage (Brodie and Schwoebel, 1994). FIG. 1 shows a microfabricated field-emission element Spindt Tip 100.

However, Spindt-tip emitters have not achieved widespread use in vacuum microelectronics, for several reasons. First, they must be lithographically defined and consequently are expensive to fabricate in large arrays. Second, metallic emitters (or metal-coated Spindt tips) now are recognized as intrinsically unstable. High-mass residual gases sputter-etch metallic emitters, while light gases ($H_2$, He) cause sputter-assisted atomic diffusion that, in the high local electric field, results in growth of nanoscale protrusions (Dyke and Dolan, 1956; Cavaille and Dechster, 1978). The protrusions in turn cause increased emission current and still more rapid protrusion growth, leading to uncontrolled emission and destruction of the emitter by a vacuum arc (Dean and Chalamala, 1999). (The effect of this intrinsic instability can be reduced by placing a series resistance in the emitter circuit (Ghis et al., 1991), to introduce negative feedback and extrinsic stability that extends lifetime.)

Electron emitters are required for a number of devices including vacuum tubes, displays, and electron lithography systems. Electrons can be extracted from an emitter by heating the emitter to a high temperature (thermal emission). However, there are many disadvantages to thermal emission. First, power is required to heat the emitter. Second, current density is low. Third, emission current is sensitive to changes in ambient temperature. Because of the high work function of electron emitter material, thermal electron emitters are used in most devices. However, stable, reproducible, mass producible field emitters would be preferred.

Recently a nanoscale field emission tube (i.e. a "nanotriode") that used metal nanopillars as field emitters was reported (Driskill-Smith and Hasko, 1999; Driskill-Smith et al., 1997). This device represents a significant step forward since it demonstrates a nanoscale electronic device that could in principle be scaled to packing densities as high as $10^{10}$ devices/cm$^2$ (Driskill-Smith and Hasko, 1999; Driskill-Smith et al., 1997). However, metal nanopillars fabricated in this way are only marginal field emitters, for several reasons. Through small in diameter they are not sharpened, so they have a low aspect ratio (AR=height/tip diameter) and consequently a low geometrical enhancement factor, GEF, for the local electric field. In addition, the resulting threshold field strength for significant nanopillar emission is quite high (estimated >150 V/$\mu$m from the data in Driskill-Smith and Hasko, 1999 and Driskill-Smith et al., 1997 and very close to the breakdown field of the nearby dielectric (Spindt, 1968). The nanopillars are difficult to fabricate reproducibly (there may be one or several nanopillars in each emitter well, they are not centered, and probably only the tallest nanopillar emits current).

Heretofore, the requirements of a field emitters that do not need to be lithographically defined, are non-metallic, have a high aspect ratio and consequently a high geometrical enhancement factor, have a low threshold field strength, and are relatively easy to fabricate referred to above have not been fully met. What is needed is a solution that addresses all of these requirements.

SUMMARY OF THE INVENTION

There is a need for the following embodiments. Of course, the invention is not limited to these embodiments.

One embodiment of the invention is based on a method, comprising: providing a substrate; depositing a catalyst, said catalyst coupled to said substrate; depositing a dielectric layer, said dielectric layer coupled to said substrate; depositing an extractor layer, said extractor layer coupled to said dielectric layer; forming an extractor aperture in said extractor layer; forming a dielectric well in said dielectric layer to expose at least a portion of said catalyst; and then fabricating a carbon containing tip i) having a base located substantially at said bottom of said dielectric well and ii) extending substantially away from said substrate. Another embodiment of the invention is based on an apparatus, comprising: a substrate; an electrode structure coupled to said substrate, said electrode structure including a dielectric layer coupled to said substrate, said dielectric layer including a dielectric well that is formed in said dielectric layer after said dielectric layer is deposited; and an extractor layer coupled to said dielectric layer, said extractor layer including an extractor aperture; and a carbon containing tip coupled to said substrate, said carbon containing tip having a base located substantially at a bottom of said dielectric well and extending substantially away from said substrate, said carbon containing tip being grown from the bottom of said dielectric well using a catalyst that is introduced at said bottom of said dielectric well after said dielectric well is formed. Another embodiment of the invention is based on a method comprising: providing a substrate on a heater plate in a vacuum chamber; providing a carbon source gas and an etchant gas; heating said substrate with said heater plate; and then fabricating a carbon containing tip on said substrate with said carbon source gas and said etchant gas using plasma enhanced chemical vapor deposition.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 4:
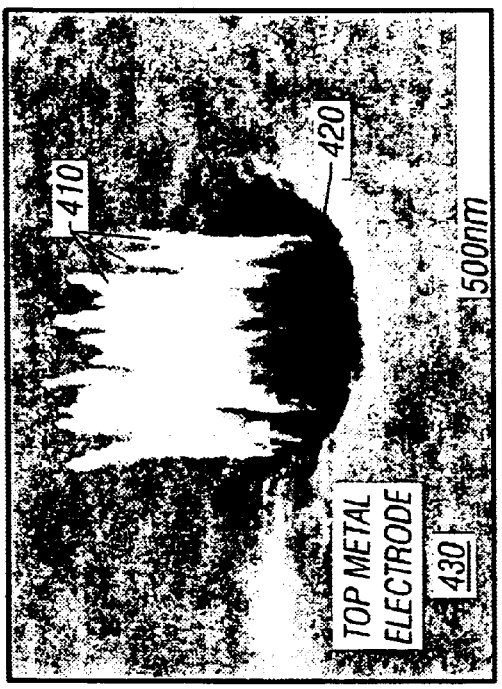
FIG. 4 illustrates a scanning electron micrograph view of multiwall nanotubes grown in a prefabricated electrode structure, representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

Within this application several publications are referenced by author's name within parentheses. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patent, and U.S. Patent Application, disclose embodiments that were satisfactory for the purposes for which they are intended. The entire contents of U.S. Pat. No. 6,078,392 are hereby expressly incorporated by reference herein for all purposes. The entire contents of allowed U.S. patent application Ser. No. 09/368,919, filed Aug. 5, 1999, are hereby expressly incorporated by reference herein for all purposes. The entire contents of U.S. Patent Application (attorney docket no. UBAT:027US), filed Feb. 27, 2001, are hereby expressly incorporated by reference herein for all purposes.

Carbon nanotubes (CNTs) constitute a novel class of nanoscale materials that are very promising for use as electron sources (cold cathodes) in various devices. The exceptional suitability of CNTs for electron field emission (FE) applications is due to at least the following reasons.

First, CNTs have an intrinsically high aspect ratio. As a result, the applied electric field is greatly enhanced at the ends of CNTs (the geometrical enhancement factor is approximately proportional to the AR), allowing electron emission at low applied fields. This is quite important because for sufficiently high AR, the resulting threshold field may be low enough to employ presently available low-voltage commercial integrated circuit electronics to extract and control current.

Second, carbon is chemically inert and highly resistant to sputtering which makes it a durable material for field emission applications. Recent studies using randomly oriented, commercial single-walled nanotubes (SWNTs) without a series resistor convincingly demonstrate that nanotubes are much less sensitive to the operating environment have much better long-term stability than conventional metallic emitters (Dean and Chalamala, 1999). Protrusion growth and runaway emission were not observed for SWNTs. In fact, SWNTs were operated continuously for 100 hours in $10^{-7}$ Torr of $H_2O$ with no current degradation (Dean and Chalamala, 1999). This is equivalent to more than 10,000 hours operation at a typical emitter duty cycle of <1%. It has been suggested that the reason nanotubes do not exhibit protrusion growth is that carbon atoms have both a very low sputter yield and low mobility, and that MWNTs degrade even more slowly than SWNTs (Bonard et al., 1998). The durability and environmental stability of nanotubes is among the best of any material (Dean and Chalamala, 1999), providing for good emission stability and long lifetime that are vital parameters for actual working devices (Ahmed et al., 1999).

Field emission tests of randomly oriented, spaghetti-like CNT "mats" have been performed at ORNL (Lowndes et al., 1999) and by other research groups (de Heer et al., 1995; Lee et al., 1999). The tests show that CNTs are very good field emitters with quite low emission threshold field. $E_{th}$, below 10 V/$\mu$m. Unfortunately, the absence of any control of alignment, and very limited control of the CNT dimension (length and diameter), combined with inability to control their placement (location) makes utilization of these CVD-grown mats rather difficult in vacuum electronic devices. Moreover, it is clear that the low-Eth emission observed from randomly oriented nanotube mats corresponds to only a very low density (~100/cm$^2$) of the best emitting sites (Lee et al., 1999), not consistent with near-identical emitters whose location is controlled on the nanoscale.

To realize the great potential of the nanotriode concept, a robust, controllable, and reproducible method is needed to fabricate the field emission element in place in the nanoscale device structure. The invention can include plasma-enhanced chemical vapor deposition (PE-CVD) growth of isolated, vertically oriented multi-wall carbon nanotubes (MWNTs) in place within a predefined electrode structure. Thus, the invention is an important next step in the development of integrated vacuum micro/nanoelectronics.

The invention can include making field emission devices that use carbon nanofibers (CNFs) as the electron emitter. Alternatively, the invention can include making field emission devices that use single-wall carbon nanotubes or multi-wall carbon nanotubes. The invention can have applications in a number of areas with a large economic impact including vacuum micro/nanoelectronics for communications, flat panel displays, lithography for integrated circuit production. The invention is compatible with microelectronic-like mass production.

The invention can combine key components of materials research and device research to develop new field-emission-based vacuum nanoelectronic devices for high-bandwidth communications; for high-temperature and high-radiation circuits, sensors, or systems; and for other sub-micron vacuum electronics applications. Additional large economic impact applications for these devices can include flat panel displays, and massively parallel E-beam lithography. Collectively all of these technologies can be referred to as vacuum micro- or nanoelectronics.

The invention can include vacuum microelectronic or nanoelectronic devices based on a deterministically-grown carbon nanofiber (CNF) as the field emission element. Alternatively, the invention can include vacuum microelectronic or nanoelectronic devices based on a deterministically-grown single-wall carbon nanotube or multi-wall carbon nanotube as the field emission element. Furthermore, this element can be grown in place (in situ) in a prefabricated electrode structure using a relatively low temperature process.

Figure 2:
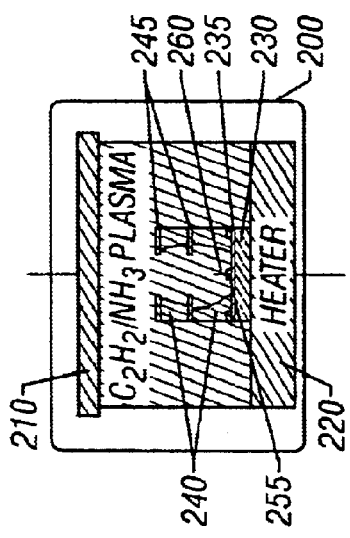
FIG. 2 illustrates a schematic view of an integrated emitter being grown in a plasma enhanced chemical vapor deposition processing chamber, representing an embodiment of the invention.

The invention can include catalytically-controlled growth of vertically aligned (i.e. substantially perpendicular to the substrate surface), multi-walled CNTs (Merkulov et al., 2000). Referring to FIG. 2, a PE-CVD process for growing MWNT in place in a prefabricated electrode structure is depicted. A vacuum chamber 200 includes an anode 210 and a cathode 220. A substrate 230 is located on the cathode 220. A barrier layer 235 is formed on the substrate 230. A plurality of dielectric layers 240 alternating with a plurality of extractor layers 245 compose an electrode structure 250. The process utilizes plasma-enhanced chemical vapor deposition (PE-CVD) in conjunction with evaporation and precise placement of a metal-catalyst dot 255. The catalyst dot 255 can be a nickel catalyst particle that is deterministically placed by lithographic definition. A mixture of acetylene ($C_2H_2$) and ammonia ($NH_3$) is used as a source gas during the PE-CVD process. The substrate 230 is heated above ~600° C. After the plasma is turned on, MWNTs grow selectively at the locations where catalyst dots (e.g., Ni, Fe, Co) were pre-deposited. A single self-aligned MWNT 260 can be grown in place (in situ) via the catalyst dot 255. The MWNT 260 can be carbon containing or substantially pure carbon. The method depicted in FIG. 2 can also be used to fabricate self-aligned single wall carbon containing nanotube and./or self-aligned carbon containing nanofibers. Similarly, these SWNTs and/or NFs can be carbon containing or substantially pure carbon.

In the method depicted in FIG. 2, no hot filament is present and the substrate 230 is heated directly by placing them on a heater plate (e.g., the cathode 220). This technique has the advantages of growth-temperature control and large-area deposition (not possible with a hot filament) and therefore creates the possibility of industrial-scaleable device fabrication.

Figure 3A:
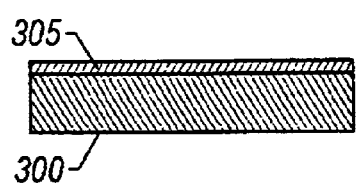
FIGS. 3A–3G illustrate schematic views of an electrode-emitter fabrication method, representing an embodiment of the invention.
Figure 3B:
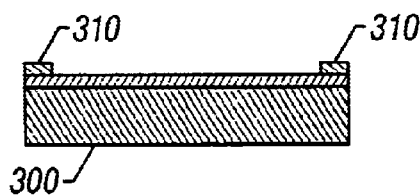
Figure 3C:
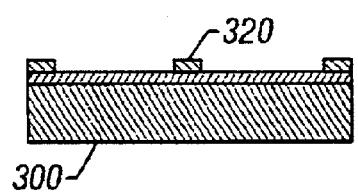
Figure 3D:
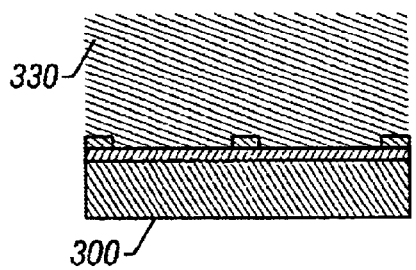
Figure 3E:
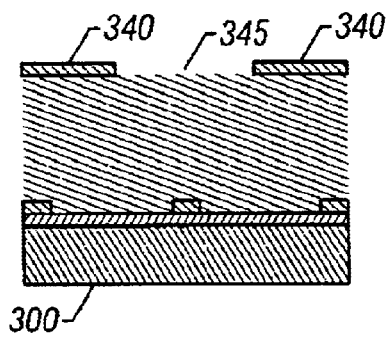
Figure 3F:
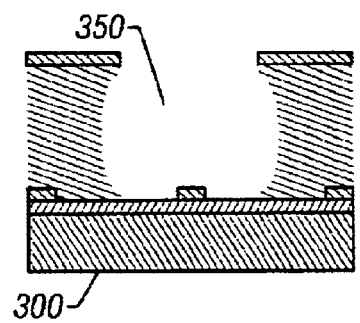
Figure 3G:
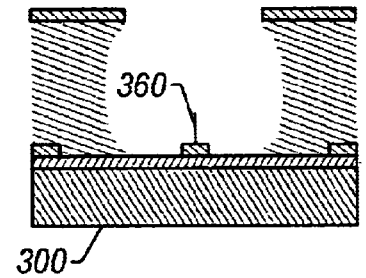

FIGS. 3A–3G show a fabrication process for a MWNT-based vacuum nanoelectronic device. The device depicted in FIGS. 3A–3G is a simple gated electron emitter structure that can be the basis for more complex vacuum nanoelectronic devices. In FIGS. 3A–3F, an electrode structure is defined through lithographic steps. In FIG. 3A, a buffer layer 305 is deposited on a substrate 300. The substrate 300 can be 4" n-Si and the buffer layer 305 can be a titanium-tungsten alloy. In FIG. 3B, alignment mark 310 are formed on the buffer layer 305. The alignment marks 310 can include gold and could be conductive traces. The alignment marks are for subsequent photolithography and critical dimension (CD) measurements. Referring to FIG. 3C, one of the steps in this process is the definition of a catalyst particle 320. The catalyst particle can include one, or more, of nickel, iron and cobalt. The catalyst can be a round dot of approximately 100 nm diameter on a 50 micron pitch. The catalyst particle can be one member of an array where the dots are arranged on a pitch of approximately 50 microns. FIG. 3D shows a dielectric layer 330 deposited over the catalyst particle 320, the traces 310 and the buffer layer 305. The dielectric layer can include silica. In this case, the silica can be deposited using PECVD at a temperature of approximately 275° C. FIG. 3E shows an extractor layer 340 deposited over the dielectric layer 330. The extractor layer 340 can be termed a gate electrode. The extractor layer 340 can be a chromium layer approximately 150 nm thick. There is an extractor aperture 345 formed in the extractor layer 340. The extractor aperture 345 can be formed using a spin-on photoresist. FIG. 3F shows a dielectric well 350 formed in the dielectric layer 330. The dielectric well can be formed using reactive ion etching using the extractor layer 340 as an etch mask. The formation of the dielectric well should uncover the catalyst particle 320 to catalyze growth. The dielectric well 350 can be coincident with the extractor aperture 345. Referring to FIG. 3G, after the entire electrode structure is fabricated, and the catalyst is uncovered, a MWNT 360 is grown in place (in situ) within the electrode structure. The growth can be by PECVD at a temperature of from approximately 660 to approximately 700° C.

By separating the emitters a weaker field can be used to turn on emission. In addition, arcing is reduced. By fabricating the emitters at the bottom of the dielectric well, each emitter (and optionally its beam) can be individually controlled electrostatically with on-board grids.

Figure 13:
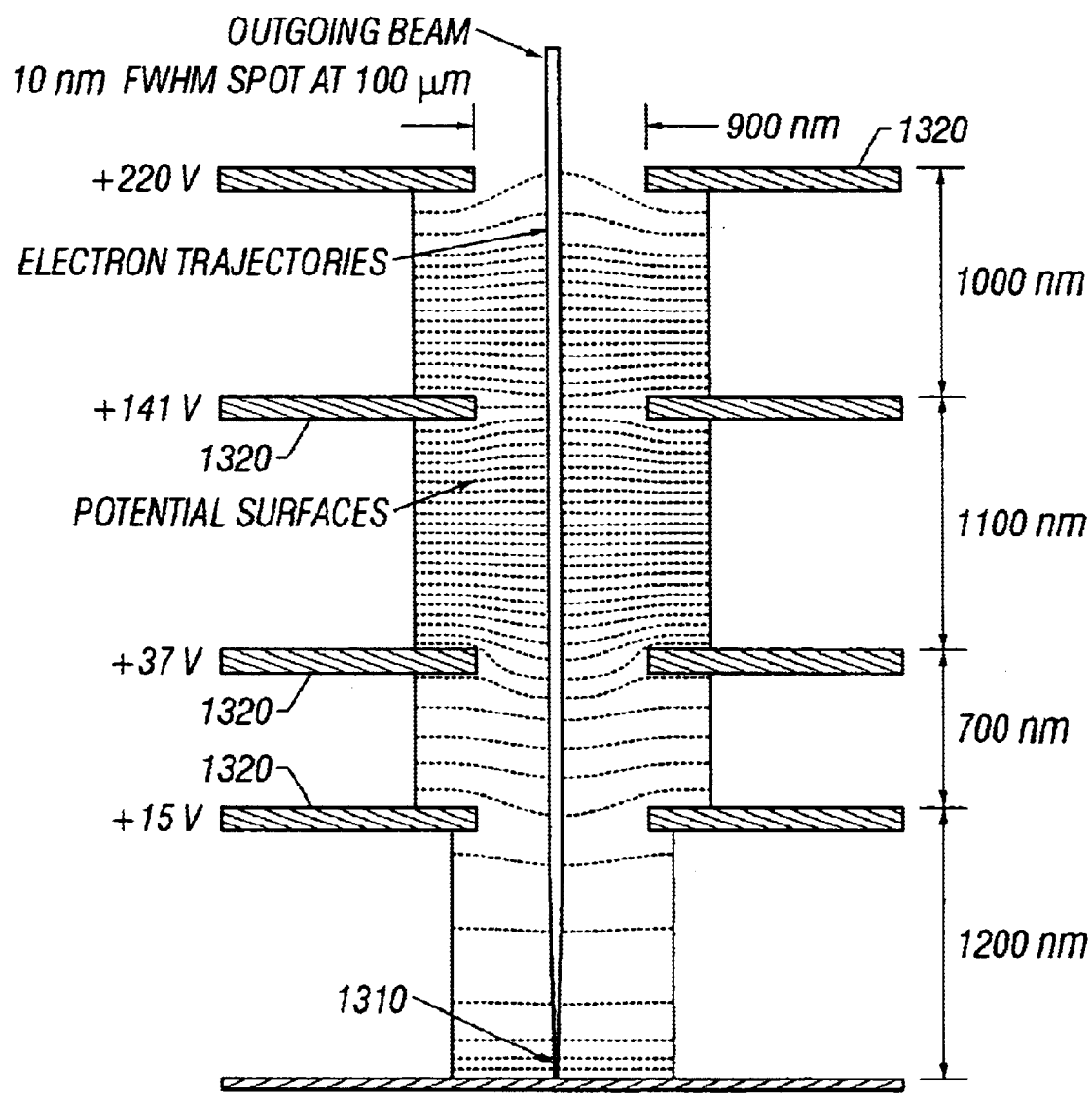
FIG. 13 illustrates an optic design, representing an embodiment of the invention.

The invention can include an extraction, acceleration and focusing optic design. Referring to FIG. 13, an optic design for a 10 nm diameter point source is shown. An array of emitters could be assembled by duplicating this design in parallel, optionally on a single chip. It is noted that the LMCD (logic, memory control and detector) circuitry beneath the emitter is not shown, nor is the split-ring detector at the top of each focusing stack (to implement the in situ SEM function discussed below). The design includes a point source 1310 that is approximately 70 nm tall and has a radius of approximately 5 nm. This particular design includes four grids 1320. Of course, the invention is not limited to the dimensions shown in FIG. 13.

The invention can include a digitally addressable field emitter array. The invention can include a high density of emitter cathodes. The invention can include an on-chip electrostatic lens. The invention can obviate the need for magnetic lenses, beam deflectors and/or separate beam blankers.

The invention can be used for massively parallel digital electrostatic e-beam array lithography. This approach can enable a maskless microelectronics fabrication technology having high throughput and minimal wafer motion. This fabrication technology can provide substantially absolute reliability in writing and verifying pixels. This fabrication technology is scalable to approximately a 10 nm feature size, given 5 nm pixels.

The invention can include providing an array of carbon containing tips with a split ring detector for backscattered electrons. Similarly, a plurality of arrays can be provided with a corresponding plurality of detectors. Thus, the invention can be used for an integrated high-speed scanning electron microscope. Further, the invention can be used for massively parallel wafer metrology and inspection.

The invention can also utilize data processing methods that transform signals from the carbon containing tips being grown to control the growth process. For example, the invention can be combined with instrumentation to obtain state variable information to actuate interconnected discrete hardware elements. For instance, the invention can include the use of data acquired by detecting a laser beam reflected at the tips to control the growth of the tips. Similarly, the invention can include the use of electron emission detection data to control the growth of the tips.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

The particular manufacturing process used for the fabricating the carbon containing tips should be inexpensive and reproducible. Conveniently, the carbon containing tips of the invention can be carried out by using any vacuum deposition method. It is preferred that the process be chemical vapor deposition. For the manufacturing operation, it is an advantage to employ a plasma enhanced technique.

However, the particular manufacturing process used for the carbon containing tips is not essential to the invention as long as it provides the described functionality. Normally those who make or use the invention will select the manufacturing process based upon tooling and energy requirements, the expected application requirements of the final product, and the demands of the overall manufacturing process.

The particular material used for the carbon containing tips should be substantially pure. Conveniently, the carbon containing tips of the invention can be made of any source of carbon material. It is preferred that the material be gaseous. For the manufacturing operation, it is an advantage to employ an alkene or alkine material.

However, the particular material selected for producing the carbon containing tips is not essential to the invention, as long as it provides the described function. Normally, those who make or use the invention will select the best commercially available material based upon the economics of cost and availability, the expected application requirements of the final product, and the demands of the overall manufacturing process.

The disclosed embodiments show a plasma discharge vacuum chamber as the structure for performing the function of fabricating the carbon containing tips, but the structure for fabrication of tips can be any other structure capable of performing the function of fabrication, including, by way of example a simple chemical vapor deposition chamber or a physical vapor deposition chamber.

The disclosed embodiments show a circular aperture as the structure for performing the function of extraction, but the structure for extraction can be any other structure capable of performing the function of extraction, including, by way of example a regular polygon, an ellipse or even a channel or slit.

While not being limited to any particular performance indicator or diagnostic identifier, preferred embodiments of the invention can be identified one at a time by testing for the presence of uniformly shaped emitters. The test for the presence of uniformity can be carried out without undue experimentation by the use of a simple and conventional imaging experiment. Among the other ways in which to seek embodiments having the attribute of uniformity guidance toward the next preferred embodiment can be based on the presence of precise electrical properties, such as field emission.

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

Multiwall carbon nanotubes can be fabricated by the steps shown in FIGS. 3A–3G using acetylene as the carbon source gas and ammonia as the etchant. FIG. 4 shows an SEM (scanning electron microscope) image of a plurality of multiwall carbon nanotubes 410 grown in a prefabricated electrode well structure 420. The tubes were intentionally grown past the top metal electrode 430 to allow easy imaging.

Example 2

Figure 5:
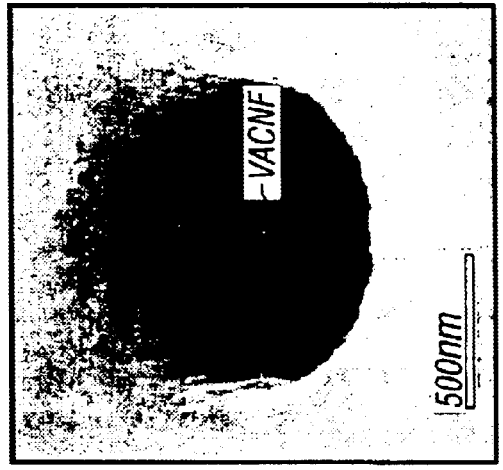
FIG. 5 illustrates a single, isolated carbon nanofiber at the center of a well, representing an embodiment of the invention.
Figure 1:
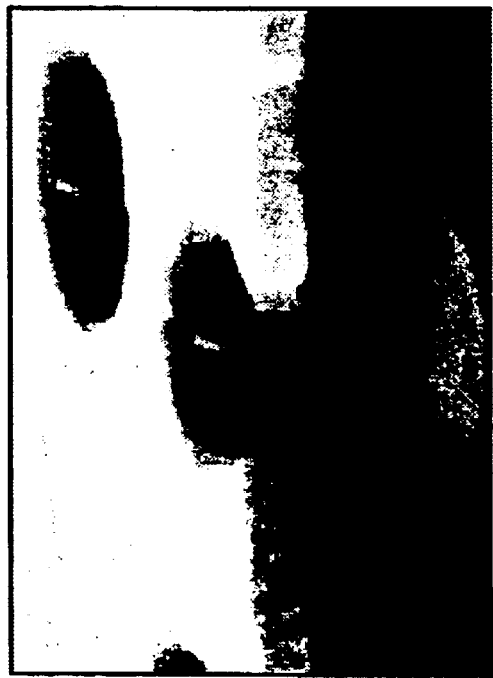
FIG. 1 illustrates a scanning electron micrograph view of a conventional microfabricated field-emission element (Spindt Tip), appropriately labeled "PRIOR ART."

The invention can be used to grow vertically aligned carbon nanofibers centered in electrode structure wells (dielectric layer wells). Two lithography steps placed a nickel catalyst dot near the center of the base of a well. Reactive ion etching was used to release the nickel dot from PECVD oxide to catalyze growth of a single, isolated carbon nanofiber 510. FIG. 5 shows the single, isolated carbon nanofiber 510 located substantially at the center of the well and having a height of approximately 950 nm and a radius of less than or equal to approximately 17 nm.

Example 3

Figure 6:
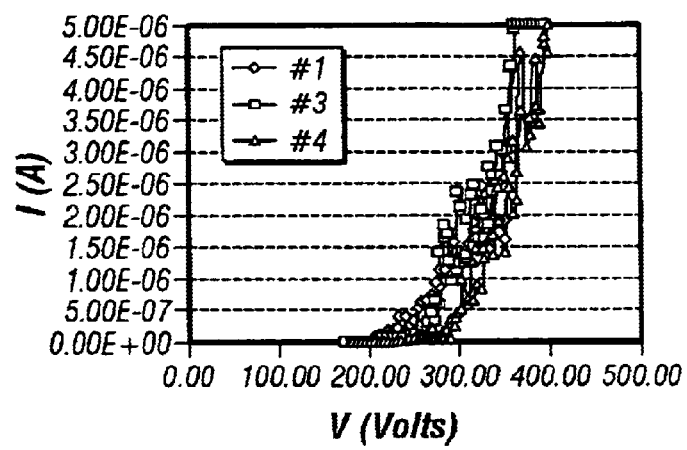
FIG. 6 illustrates field emission measurements from individual vertically aligned carbon nanofibers, representing an embodiment of the invention.
Figure 12:
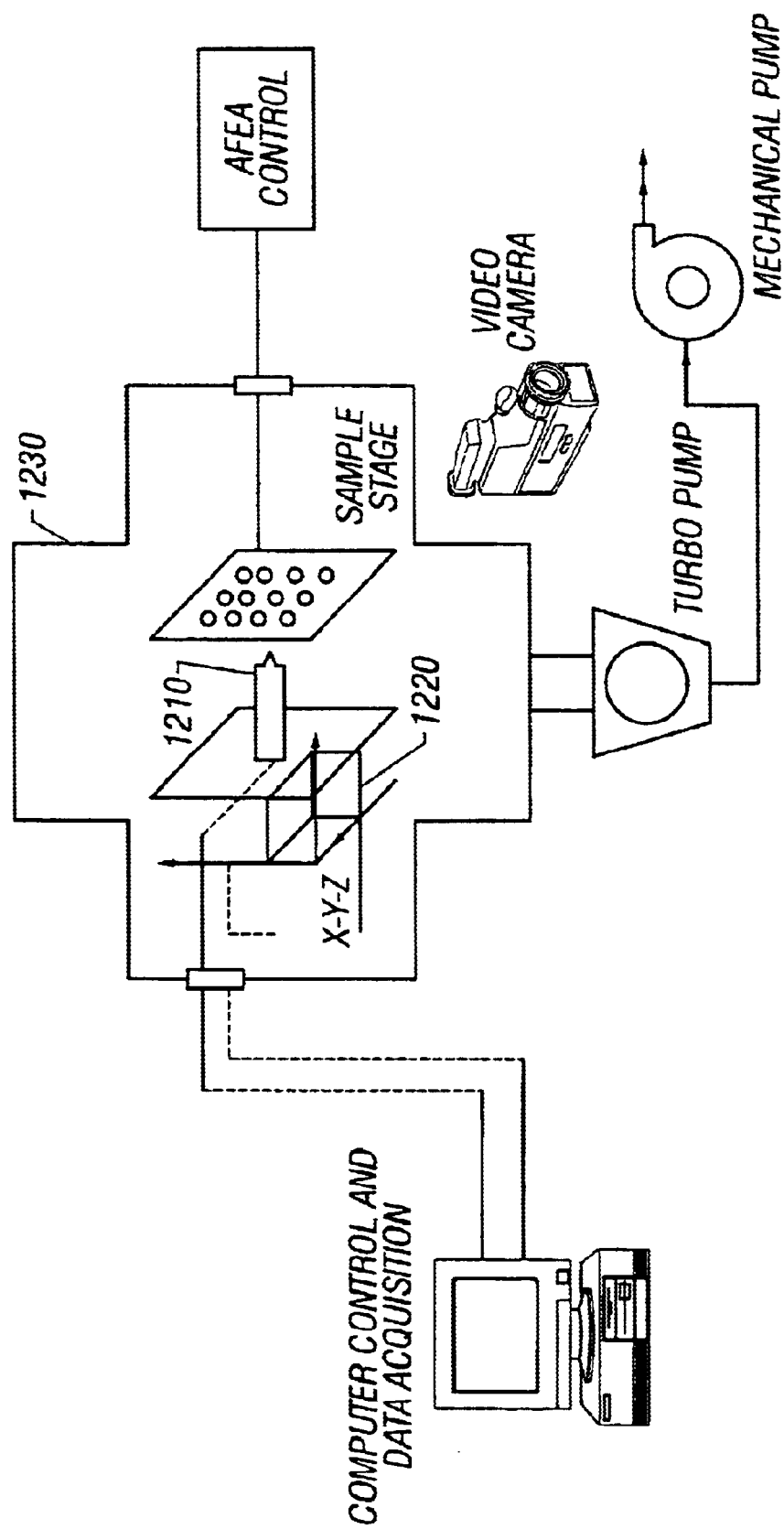
FIG 12 illustrates the measurement system used to obtain the data depicted in FIG. 6.

Field emission measurements from individual vertically aligned carbon nanofibers (VACNFs) are shown in FIG. 6. Scanned-probe measurements show Fowler-Nordheim-like I-V (current-voltage) characteristics. Field emission currents of greater than approximately 5 uA were obtained (e.g., approximately 500 kA/cm2 for 30-nm tip diameter). The measurement system used to obtain the data in FIG. 6 is shown in FIG. 12. Referring to FIG. 12, a current probe 1210 is mounted on an X-Y-Z positioner 1220 within a vacuum chamber 1230. The current probe functioned as an anode and was scanned with selectable tip diameter of from approximately 0.4 micron to approximately 1 millimeter. The probe stage was moved in 75 nm steps (X-, Y-, and Z-).

Example 4

Figure 7B:
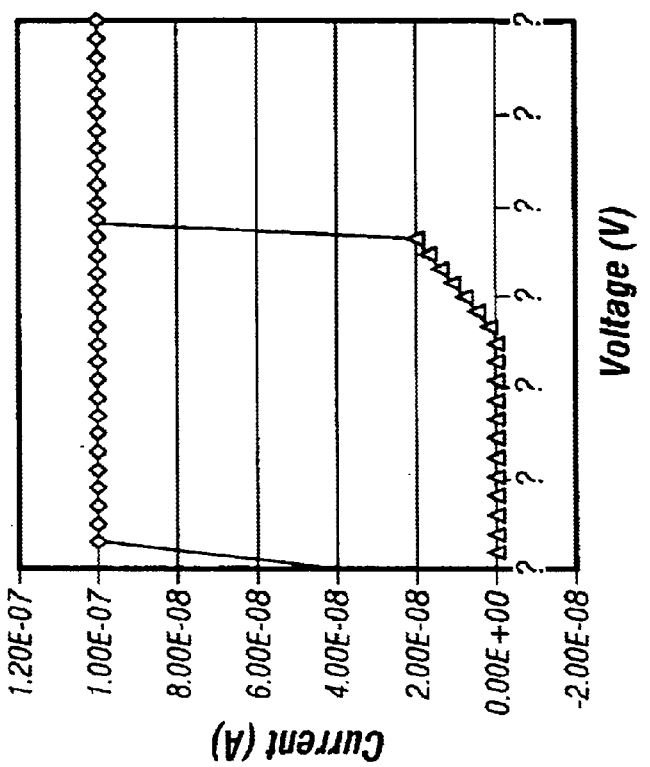
FIGS. 7A and 7B illustrate a portion of a matrix of apertures and corresponding current as a function of voltage results, representing an embodiment of the invention.
Figure 7A:
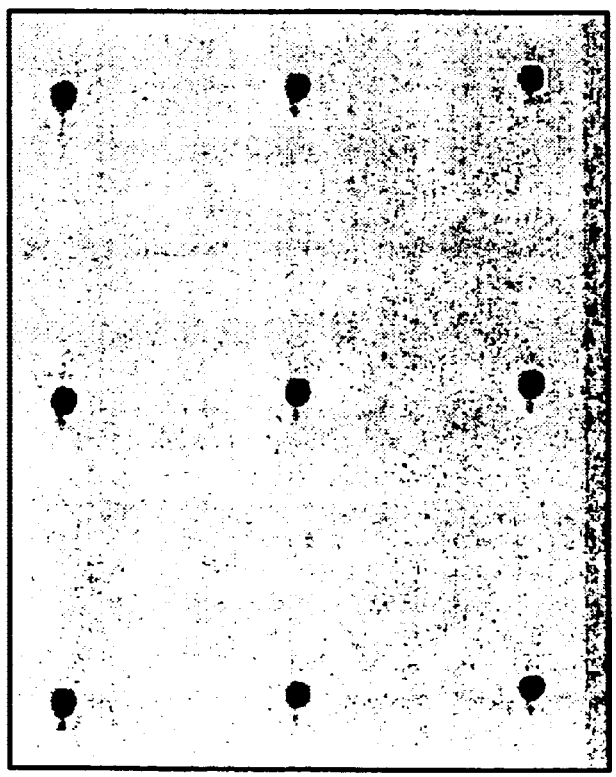

The break down electric field of a PECVD electrode structure of silica was measured. A portion of a 5×5 matrix of 1 micron apertures before VACNF growth is shown in FIG. 7A. The test was performed with increasing/decreasing sweep and a 100 nA current limit. FIG. 7B shows that the oxide layer withstands approximately 150 volts/micron before significant leakage. For comparison, sputtered silica is shown to breaks down at approximately 600 volts/micron under the same conditions.

Example 5

Figure 8A:
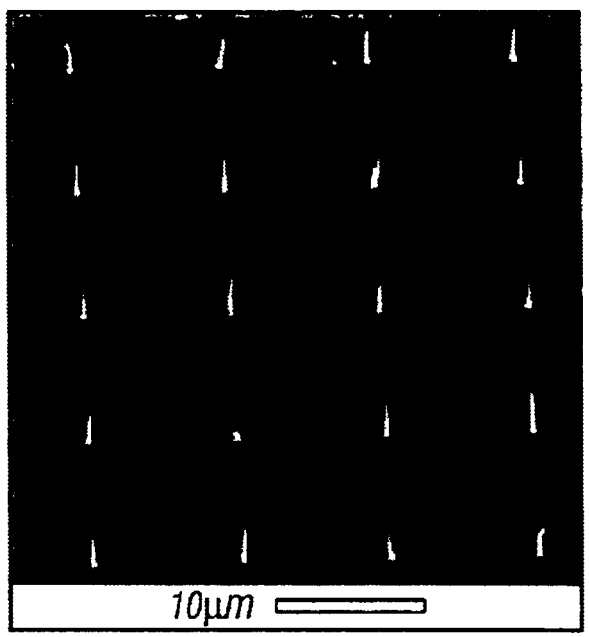
FIGS. 8A and 8B illustrate a group of vertically aligned carbon nanofibers and a vertically aligned carbon nanofiber in greater detail, representing embodiments of the invention.
Figure 8B:

An array of individual, vertically aligned carbon nanofibers were grown by a PECVD process. E-beam lithography was used to define approximately 100 nm diameter metal catalyst sites in a resist. Physical vapor deposition was used to deposit a metal buffer layer and a thin-film layer of catalyst dots (electron beam lithography patterned). The use of PECVD resulted in individual, isolated vertically aligned carbon nanofibers (VACNFs) grown at 10 micron to 50 micron pitch. FIG. 8A shows a group of VACNFs grown at 10 micron pitch from the EBL (electron beam lithography) patterned catalyst dot array. The most defective region (2/20) is shown in FIG. 8A. FIG. 8B shows on VACNF in greater detail. VACNF growth is mainly defect-free.

Example 6

Apertures of approximately 1 um and approximately 600 nm have been fabricated. An electron emitter array could use approximately 500 nm or larger diameter apertures at a pitch of approximately 4 um×approximately 8 um. Such an electron emitter array could include up to approximately 4 conductive beam extraction/accelerating/focusing grids, separated by dielectric layers (e.g., insulating silica). The entire array could be turned on/off by a first grid voltage. Individual emitters could be programmed on/off and balanced using LMC (logic, memory and control) circuitry. It is desirable that the total thickness of the grid stack not exceed approximately 5 microns. The electric field strength should be limited by dielectric breakdown constraints to approximately 100 volts/micron. The corresponding focused electron beamlet spot sizes should be from approximately 5 nm to approximately 20 nm at a write distance of approximately 100 microns, given the need for feature sizes of from approximately 10 nm to approximately 40 nm. The corresponding electron beamlet energy should be from approximately 200 eV to approximately 300 eV to substantially eliminate the proximity effect.

Example 7

Figure 9A:
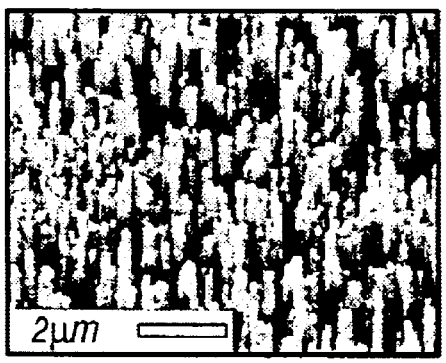
FIGS. 9A, 9B, 9C and 9D illustrate vertically aligned carbon nanofibers, representing embodiments of the invention.
Figure 9B:
Figure 9C:
Figure 9D:
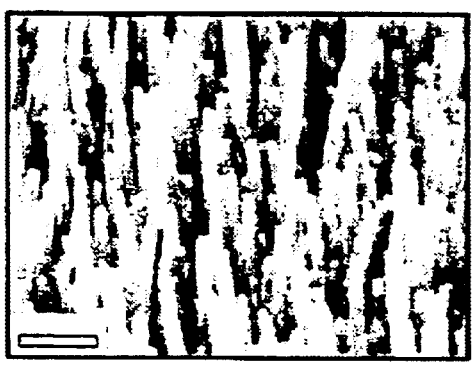
Figure 10A:
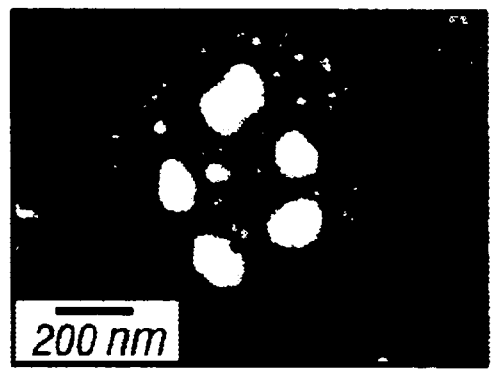
FIGS. 10A, 10B, 10C, 10D, 10E and 10F illustrate formation of nickel droplets and subsequent growth of vertically aligned carbon nanofibers, representing embodiments of the invention.
Figure 10D:
Figure 10B:
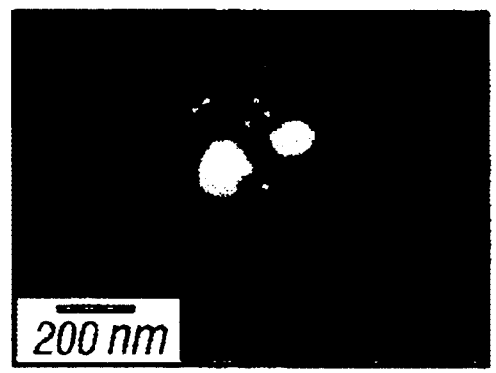
Figure 10E:
Figure 10C:
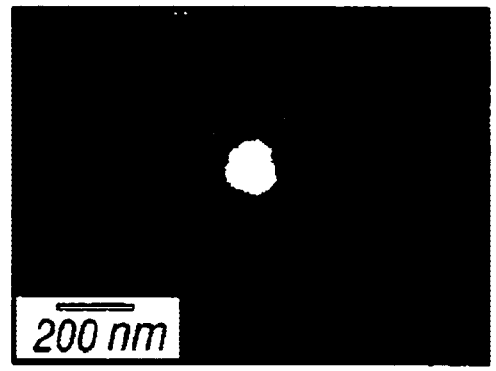
Figure 10F:

Non-deterministic vertically aligned carbon nanofibers were grown using PECVD and a heated substrate holder. A thin film of nickel catalyst was deposited on a substrate using an ex situ e-beam evaporator. The catalyst film was plasma etched using a DC glow discharge plasma at a moderate temperature (Tg approximately 700° C.). Catalyst nanodroplets were randomly formed during heat to Tg. The nanofibers were grown from the tip resulting in a chaotic (unpatterned) forest of VACNFs. FIG. 9A shows short straight VACNFs gown in less than or approximately 5 minutes. FIG. 9B shows VACNFs well attached to the substrate. FIGS. 9C–9D show that the nanofiber tip diameters scale with the size of the catalyst nanoparticles. FIG. 9C shows VACNFs grown from catalyst particles of greater than or approximately equal to 100 nm diameter. In contrast, FIG. 9D shows VACNFs grown form catalyst particles of approximately 30 nm diameter.

Example 8

Deterministic vertically aligned carbon nanofibers were grown from a single evaporated catalyst thin-film dot using PECVD and a heated substrate holder. An evaporated nickel thin film dot of catalyst was provided on titanium buffer overlaying a silicon substrate. The nickel catalyst dot broke up into nanoscale droplets upon heating to approximately 700° C. (Above a critical initial dot diameter, multiple nickel droplets break up from the initial dot yielding multiple VACNFs; below the critical initial dot diameter, there is no breakup yielding a single VACNF.) In either event, the nickel nanodroplet rides upward on the growing fiber, thereby providing continued catalytic growth. FIGS. 10A–10F show formation of multiple (10A–10B) and single (FIG. 10C) nickel droplets from the patterned droplets and subsequent growth of multiple (FIGS 10D–10E) and single (FIG. 10F) VACNFs. The nickel droplets were formed during NH3/He plasma pre-etching and heat up to 600–700° C. The SEM images in FIGS. 10A–10C were taken at 15 kV and 0° tilt. The SEM images in FIGS. 10D–10F were taken at 15 kV and 50° tilt.

Example 9

Figure 11A:
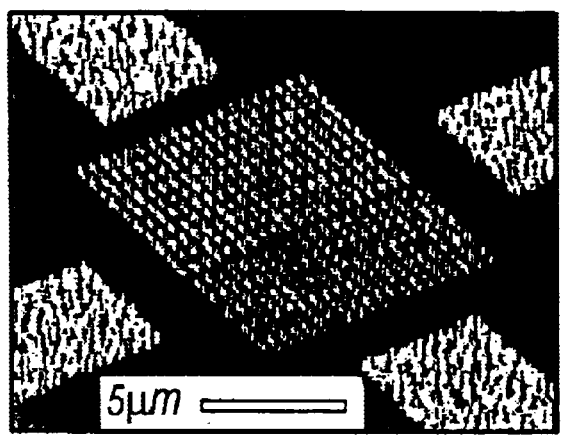
FIGS. 11A, 11B and 11C illustrate arrays of vertically aligned carbon nanofibers, representing embodiments of the invention.
Figure 11B:
Figure 11C:
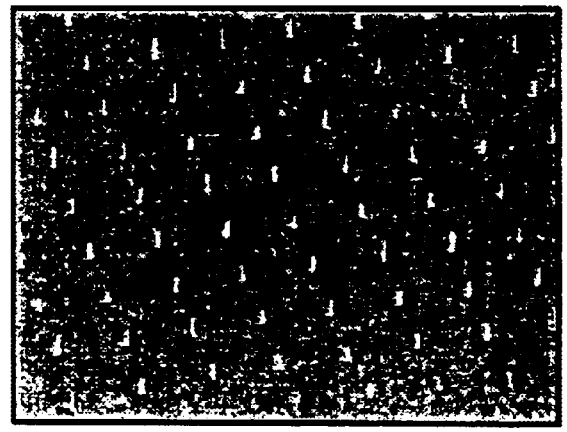

Deterministic arrays of vertically aligned carbon nanofibers were grown from catalyst dots using PECVD and a heated substrate holder. FIGS. 11A–11C show arrays fabricated with highly deterministic growth of VACNFs. The VACNF locations are a function of the catalyst dot pattern. The VACNF tip diameter is a function of; the catalyst nanodroplet size. The VACNF height is a function of the growth time.

Practical Applications of the Invention

A practical application of the invention that has value within the technological arts is the generation of a high density electric field. Further, the invention is useful in conjunction with vacuum micro/nano electronics including: high frequency, high temperature, high radiation electronics; flat panel displays; massively parallel digital electrostatic e-beam array lithography and/or electron microscopy. There are virtually innumerable uses for the invention, all of which need not be detailed here.

Advantages of the Invention

An electron emitter representing an embodiment of the invention, can be cost effective and advantageous for at least the following reasons. The field emitter can be a catalytically-grown multiwall carbon nanotube (or nanofiber). The emitter can be deterministically grown (i.e. grown to the length and diameter the inventors choose at the position the inventors choose. The emitter can be grown in place within a prefabricated electrode structure—easy compatibility with mass production. The emitter can be highly resistant to sputtering and protrusion growth and can, therefore, be intrinsically stable. Because field emission is used, the devices can be inherently temperature insensitive. Devices made with carbon nanofibers are inherently radiation tolerant. The invention improves quality and/or reduces costs compared to previous approaches.

All the disclosed embodiments of the invention disclosed herein can be made and used without undue experimentation in light of the disclosure. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, homologous replacements may be substituted for the substances described herein. Further, agents which are both chemically and physiologically related may be substituted for the agents described herein while the same or similar results would be achieved. Further, variation may be made in the steps or in the sequence of steps composing methods described herein.

Further, although the carbon containing tips described herein can be a separate module, it will be manifest that the carbon containing tips may be integrated into the system with which they are associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

Brodie and Schwoebel, "Vacuum microelectronic devices," *Proc. IEEE*, 82(7):1006–1034, 1994.

Temple, "Recent progress in field emitter array development for high performance applications," *Mat. Sci. and Eng.* R24:185–239, 1999.

Spindt, "A thin film field emission cathode," *J. Appl. Physics.*, 39:3504–3505, 1968.

Dyke and Dolan, *Adv. Electronics Electron Phys.*, 8:89, 1956.

Cavaille and Dechsler, *Surf Sci.*, 75:342, 1978.

Dean and Chalamala, *Appl. Phys. Lett.*, 75:3017, 1999.

Ghis, Meyer, Rambaud, Levy and Leroux, *IEEE Trans. Elec. Dev.*, 38:2320, 1991.

Driskill-Smith and Hasko, "The 'Nanotriode', a nanoscale field-emission tube," *Appl. Phys. Lett.*, 75(18) :2845–2847, 1999.

Driskill-Smith, Hasko, Ahmed, "Fabrication and behavior of nanoscale field emission structures," *J. Vac. Sci. Technol.*, B15:2773, 1997.

Bonard, Maier, Stockli, Chatelain, de Heer, Salvetat, Forro, *Ultramicroscopy*, 73:7, 1998.

Ahmed, Choi, Chung, Kang, Kim, Jin, Han, Lee, Jung, Lee, Park, Kim, *Appl. Phys. Lett.*, 75:3129, 1999.

Lowndes, Merkulov, Baylor, Jellison, Poker, Kim, Sohn, Paik, *Amorphous and Nanostructured Carbon*, MRS Fall Meeting, 1999.

De Heer, Chatelain, Ugarte, *Science*, 270:1179, 1995.

Lee et al., *Chem. Phys. Lett.*, 312:461, 1999.

Merkulov, Lowndes, Wei, Eres, *Appl. Phys. Lett.*, 76(24), 2000.

Ren, Huang, Xu, Wang, Bush, Siegal, Provencio, *Science*, 282:105, 1998.

Ren, Huang, Wang, Wen, Xu, Wang, Calvet, Chen, Klemic, Reed, *Appl. Phys. Lett.*, 75:1086, 1999.

Baker, "Catalytic Growth of Carbon Filaments," *Carbon*, 27:325, 1989.

What is claimed is:

1. A method, comprising:

providing a substrate;

defining lithographically a catalyst particle, said catalyst particle coupled to said substrate;

depositing a dielectric layer, said dielectric layer coupled to said substrate;

depositing an extractor layer, said extractor layer coupled to said dielectric layer;

forming an extractor aperture in said extractor layer;

forming a dielectric well in said dielectric layer to uncover said catalyst particle; and then fabricating at a location of said catalyst particle and within said dielectric well a single self-aligned carbon containing tip i) having a base located substantially at said bottom of said dielectric well and ii) extending substantially away from said substrate using plasma enhanced chemical vapor deposition.

2. The method of claim 1, wherein said carbon containing tip is selected from the group consisting of a carbon containing nanofiber, a carbon containing singlewall nanotube and a carbon containing multiwall nanotube.

3. The method of claim 1, wherein fabricating a carbon containing tip includes providing a carbon source gas and an etchant gas.

4. The method of claim 3, wherein said carbon source gas includes acetylene and said etchant gas includes ammonia.

5. The method of claim 1, wherein said dielectric well is substantially coincident with said extractor aperture.

6. The method of claim 1, further comprising depositing a buffer layer before depositing said dielectric layer, said buffer layer located between said substrate and said dielectric layer.

7. The method of claim 6, wherein said buffer layer includes titanium.

8. An apparatus, comprising:

a substrate;

an electrode structure coupled to said substrate, said electrode structure including a dielectric layer coupled to said substrate, said dielectric layer including a dielectric well that is formed in said dielectric layer after said dielectric layer is deposited; and an extractor layer coupled to said dielectric layer, said extractor layer including an extractor aperture; and within said dielectric well, a single self-aligned carbon containing tip coupled to said substrate, said carbon containing tip having a base located substantially at a bottom of said dielectric well and extending substantially away from said substrate, said carbon containing tip being grown from the bottom of said dielectric well at a location a lithographically defined catalyst particle that is uncovered at said bottom of said dielectric well when said dielectric well is formed.

9. The apparatus of claim 8, wherein said carbon containing tip is selected from the group consisting of a carbon containing nanofiber, a carbon containing singlewall nanotube and a carbon containing multiwall nanotube.

10. The apparatus of claim 8, wherein said dielectric well is substantially coincident with said extractor aperture.

11. The apparatus of claim 8, wherein the dielectric layer includes silica.

12. The apparatus of claim 8, wherein the dielectric well includes a concave sidewall.

13. The apparatus of claim 8, wherein said base of carbon containing tip is located substantially at a center of said bottom of said dielectric well.

14. The apparatus of claim 8, further comprising a buffer layer located between said substrate and said carbon containing tip.

15. The apparatus of claim 14, wherein said buffer layer include titanium.

16. An electron emitter array comprising the device of claim 8.

17. An integrated circuit, comprising the electron emitter array of claim 16.

18. A circuit board, comprising the integrated circuit of claim 17.

19. An electron beam lithographic stepper, comprising the circuit board of claim 18.

20. A method, comprising:

providing a substrate on a heater plate in a vacuum chamber;

defining lithographically a catalyst particle, said catalyst particle coupled to said substrate;

providing a carbon source gas and an etchant gas;

heating said substrate with said heater plate; and then fabricating a single self-aligned carbon containing tip, at a location of said catalyst particle on said substrate, with said carbon source gas and said etchant gas using plasma enhanced chemical vapor deposition.

21. The method of claim 20, wherein said carbon containing tip is selected from the group consisting of a carbon containing nanofiber, a carbon containing singlewall nanotube and a carbon containing multiwall nanotube.

22. The method of claim 20, wherein carbon source gas includes acetylene and said etchant gas includes ammonia.

23. The method of claim 20, further comprising depositing a dielectric layer, said dielectric layer coupled to said substrate and depositing an extractor layer, said extractor layer coupled to said dielectric layer.

24. The method of claim 23, further comprising forming an extractor aperture in said extractor layer and forming a dielectric well in said dielectric layer.

25. The method of claim 24, wherein said extractor aperture is substantially coincident with said dielectric well.

26. The method of claim 20, wherein the catalyst particle includes at least one member selected from the group consisting of nickel, iron and cobalt.

27. The method of claim 20, wherein defining lithographically the catalyst particle includes coating said substrate with an electron beam resist, patterning said electron beam resist, depositing a buffer layer on said substrate, and removing said electron beam resist.

28. The method of claim 27, wherein said buffer layer includes titanium.

29. The method of claim 20, wherein said heater plate includes an electrode and further comprising applying a voltage bias to said substrate.

30. The method of claim 20, wherein fabricating includes at least one technique selected from the group consisting of dc glow discharge plasma enhanced chemical vapor deposition, radio-frequency plasma enhanced chemical vapor deposition and microwave plasma enhanced chemical vapor deposition.

* * * * *